Patented May 29, 1951

2,554,976

UNITED STATES PATENT OFFICE 2,554,976

POLYMERS OF POLYMETHYLSILYLENES AND METHOD OF PREPARING THE SAME

Charles A. Burkhard, Alplaus, N. Y., assignor to General Electric Company, a corporation of New York No Drawing. Application September 1, 1948, Serial No. 47,342

8 Claims. (Cl. 260—448.2)

This invention relates to novel polymeric compositions of matter comprising long chain silicon derivatives wherein silicon atoms are attached directly to each other. More particularly, the invention embraces a composition of matter selected from the class consisting of (1) a polymer consisting of a plurality of at least six silicon atoms linked directly to each other, each silicon atom containing two methyl groups attached thereto by carbon-silicon linkages and (2) a polymer consisting essentially of a plurality of silicon atoms, at least six of which are linked directly to each other and some of which are linked to another silicon atom through an oxygen atom, each of the silicon atoms in the polymer containing two methyl groups attached thereto by carbon-silicon linkages.

One of the objects of this invention is to prepare grease-like polymeric products from a dimethyldihalogenosilane and sodium.

Another object of the invention is to prepare solid benzene-soluble materials of low molecular weight consisting solely of methyl radicals and silicon atoms.

Other objects of this invention will become more apparent from the description which follows.

Chemical compositions of matter corresponding to the formula $(CH_3)_3Si-Si(CH_3)_3$ have been disclosed in the literature [see, for example, Bygden, Berichte 45, 707 (1912)]. Kipping et al. [J. Chem. Soc. 119, 830 (1921)] have prepared compositions of matter wherein there are a plurality of silicon atoms bonded to each other where the organic groups attached to the silicon atoms are all phenyl groups.

I have now discovered that I can prepare novel compositions of matter having useful properties by effecting reaction between sodium and a dimethyldihalogenosilane, for example, dimethyldichlorosilane, dimethyldibromosilane, etc., the amount of sodium employed being sufficient to remove all the halogen. By means of this reaction, compositions of matter are obtained wherein are present a plurality of silicon atoms attached directly to each other, each silicon atom having attached to it two methyl radicals by a carbon-silicon linkage.

The reaction of the dimethyldihalogenosilane with sodium to give the claimed compositions of matter is carried out in general as follows:

A reaction apparatus, preferably a pressure reactor capable of being heated and provided with a means of agitation, is charged with the dimethyldihalogenosilane and the sodium. An inert diluent, such as, for instance, octane, cyclohexane, benzene, toluene, xylene, or similar aliphatic, cycloaliphatic or aromatic hydrocarbons, is added to the mixture and the pressure reactor closed. Thereafter, the reactor is heated at a temperature at least at the melting point of the sodium (97.5), e. g., from about 100° to 200° C. or higher, while at the same time effecting agitation of the reaction mixture. A suitable temperature for the reaction has been found to be from about 110° to 120° C.

Although varying pressures may be employed, depending upon such factors as, for instance, temperature of the reaction mixture, properties desired in the resulting product, etc., it has been found practical to use pressures of the order of from about 100 to 500 p. s. i. It will, of course, be apparent to those skilled in the art that higher or lower pressures may be employed without departing from the scope of the invention.

After heating the reaction mass for a suitable length of time, for example, a period of the order of from approximately two to fifteen hours, the reaction mixture is allowed to cool, removed from the reactor, and the solid reaction product and unused sodium metal is filtered from the liquid portion comprising the inert diluent. The unused sodium is decomposed by suitable means, for example, by adding it to a mixture of about equal parts glacial acetic acid and ethanol. After decomposition of the sodium metal, the entire mixture is added to a large volume of water and the solid product resulting therefrom may be recovered by filtration.

The portion which is soluble in the inert organic solvent and which was previously removed by filtration is then fractionally distilled to yield various polymeric materials of different molecular weight containing a plurality of silicon atoms linked directly to each other, each silicon atom containing two methyl groups attached thereto by carbon-silicon linkages.

In fractionally distilling the soluble portion of the reaction product, that is, soluble in the organic diluent, there is obtained a grease-like solid residue which also is a polymeric material consisting of a plurality of silicon atoms linked directly to each other, each silicon atom containing two methyl groups attached to it by carbon-silicon linkages. In addition, there is also found in this grease-like solid an intercondensed structural unit consisting of a plurality of silicon atoms which are linked to each other by oxygen atoms, each of the silicon atoms also containing two methyl groups attached to it as described above, such structural units being identified as dimethylsiloxane units.

In order that those skilled in the art may more fully understand the manner in which these novel compositions may be prepared, the following examples are given by way of illustration and not by way of limitation. All parts are by weight.

*Example 1*

|  | Parts | Approx. Molar Ratio |
|---|---|---|
| Dimethyldichlorosilane | 700 | 1.0 |
| Sodium | 454 | 3.7 |
| Benzene | 879 |  |

The above ingredients were placed in a steel autoclave, and the autoclave closed. Upon heating the autoclave to a temperature of 115° C., an exothermic reaction developed raising the temperature very rapidly up to 200° C. with an increase in pressure in the autoclave to about 220 p. s. i. At this elevated temperature, agitation of the autoclave, which had been continuing during this period, was discontinued until the temperature of the reaction mass dropped to about 115° C., at which time it was started again. This latter temperature was maintained for approximately ten hours. At the end of this time, the autoclave and its contents were cooled and the reaction product removed. It was found that there was present a blue-colored solid. The blue-colored solid, together with unused sodium metal, was filtered from the benzene solution, and the former was added to a sufficient amount of a mixture of glacial acetic acid and ethanol to decompose the unused sodium. After decomposition of the sodium metal, the entire mixture was added to a large volume of water and the solid product resulting was recovered by filtration. This latter, solid product was washed with water until free of acid and chloride ion. The solid material was then dried at 75° C. in vacuum for two days. Analysis of this product showed it to comprise essentially a high molecular weight polymer of dimethylsilylene units consisting of a plurality of silicon atoms linked directly to each other, each of the silicon atoms containing two methyl groups attached to it by carbon-silicon linkages. Analysis of this product showed it to contain the following:

|  | Per cent |
|---|---|
| Carbon | 40.3 |
| Hydrogen | 10.2 |
| Silicon | 48.0 |

Molecular weight determination of the product showed it to be of the order of about 3200. The analytical data established that this material was a polymer consisting almost exclusively of the recurring structural unit $[(CH_3)_2Si]_x$, where $x$ has an average value of 55.

The benzene solution obtained as a result of the filtration of the solid product described previously was subjected to fractional distillation and the benzene and all the materials boiling below benzene were removed. The remaining product was subjected to fractional distillation to yield three different fractions including a solid, grease-like residue. One fraction was obtained boiling at around 140° to 145° C. at 10 mm. which consisted essentially of long needle crystals which lost their crystallinity without melting at 74° C. This material was analyzed and found to contain about 40.9 per cent carbon, 10.4 per cent hydrogen and 47.2 per cent silicon. The molecular weight determination of this product established that it had a molecular weight of about 318. The calculated composition of $[(CH_3)_2Si]_n$ polymers, where $n$ is a whole number, is as follows:

|  | Per cent |
|---|---|
| Carbon | 41.32 |
| Hydrogen | 10.41 |
| Silicon | 48.27 |

By comparison with the analytical data, it was established that the crystalline product corresponded to the formula $[(CH_3)_2Si]_6$, i. e., the hexameric dimethylsilylene (dodecamethylcyclohexasilane).

Analysis of the grease-like solid residue obtained in the fractional distillation (supra) showed it to comprise the following:

|  | Per cent |
|---|---|
| Carbon | 38.4 |
| Hydrogen | 9.3 |
| Silicon | 42.5 |
| Chlorine | 2.8 |

The molecular weight determination of this residue showed it to have a molecular weight of about 1700. The calculated composition of $$[(CH_3)_2SiO]_x$$

is

|  | Per cent |
|---|---|
| Carbon | 32.40 |
| Hydrogen | 8.16 |
| Silicon | 37.85 |
| Oxygen | 21.58 |

Inspection of the analytical data indicated that this grease-like solid product (which was insoluble in aqueous alkali) contained both $$[(CH_3)_2Si]$$

and $[(CH_3)_2SiO]$ units, together with a small amount of chlorine. Calculation of the formula which represents the average composition of the grease-like solid product indicated it to be approximately as follows:

$$\{[(CH_3)_2Si]_{28}[(CH_3)_2SiO]_{11}Cl_2\}$$

The claimed compositions of matter have been found to have various uses. For instance, the benzene-insoluble solid corresponding to the average formula $[(CH_3)_2Si]_{55}$ has been found to be effective in reducing or eliminating the foaming tendencies of lubricating oils. Thus, in one case, under equivalent conditions, when compressed air was blown through a hydrocarbon lubricating oil, it was found that whereas a sample of the oil thus treated gave a volume of about 270 cc. of foam in five minutes, the use of 0.1 per cent, by weight, of the aforementioned polymer, in the oil resulted in the formation of only 5 cc. of foam at the end of five minutes.

In addition, incorporation of the aforementioned benzene-insoluble solid product in butyl rubber reduced the nerve of the rubber and enabled the latter to be milled more easily without resorting to the use of loading the butyl rubber with large amounts of filler in order to obtain suitable milling conditions.

The grease-like solid residue obtained in accordance with the methods outlined above was capable of inducing water repellency by treating non-water-repellent objects with this material.

In effecting the reaction leading to the production of the claimed compositions of matter, the sodium should be present in an amount sufficient to remove all the silicon bonded chlorine in accordance with the equation

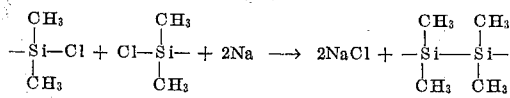

From the foregoing equation, it will be apparent to those skilled in the art that at least two mols of sodium must be employed for each mol of the dimethyldihalogenosilane. I prefer to use an excess of sodium, e. g., from 2.5 to 4 or more mols of sodium per mol of the dimethyldihalogenosilane.

By using an amount of sodium insufficient to remove all the silicon-bonded halogen of the dimethyldihalogenosilane, I have been able to obtain polymethylsilylenes containing increased amounts of silicon-bonded chlorine. Thus, I have obtained α,ω-dichloropolydimethylsilanes by heating under pressure a mixture of 115 parts sodium, 645 parts dimethyldichlorosilane and 440 parts benzene. Fractional distillation of this reaction product yielded a high boiling liquid consisting of polymeric polydimethylsilanes containing about 12.6 per cent chlorine. This material was effective in inducing water repellency to non-water-repellent surfaces.

The claimed compositions of matter may be condensed further or treated or reacted with other compositions of matter to make products having utility as resins, lubricating agents, etc.

What I claim as new and desire to secure by Letters Patent of the United States is:

1. A composition of matter selected from the class consisting of (1) a polymer consisting of a plurality of at least six silicon atoms linked directly to each other, each silicon atom containing two methyl groups attached thereto by carbon-silicon linkages and (2) a polymer having the formula

[(CH₃)₂Si]₂₈[(CH₃)₂SiO]₁₁Cl₂

2. A polymeric dimethyl silylene having the general formula [(CH₃)₂Si]$_n$, where $n$ is a whole number equal to at least 6.

3. A cyclic polymeric composition of matter corresponding to the formula [(CH₃)₂Si]₆.

4. A benzene-insoluble solid polymeric polydimethylsilylene having an average molecular weight of about 3200, the said solid polymer corresponding to the formula [(CH₃)₂Si]$_n$ where $n$ has an average value of 55.

5. The process for the preparation of a polymeric composition containing a plurality of at least six silicon atoms linked directly to each other, each silicon atom containing two methyl groups attached thereto, said process comprising effecting reaction between a dimethyldihalogenosilane and sodium, the sodium being present in an amount sufficient to remove essentially all the halogen, decomposing the unused sodium in the reaction product, and washing the soluble materials from the reaction product with water.

6. The process for the preparation of a polymeric composition containing a plurality of at least six silicon atoms linked directly to each other, each silicon atom containing two methyl groups attached thereto, said process comprising effecting reaction between dimethyldichlorosilane and sodium, the sodium being present in an amount sufficient to remove essentially all the chlorine, decomposing the unused sodium in the reaction product, and washing the soluble materials from the reaction product with water.

7. The process for the preparation of a polymeric composition containing a plurality of at least six silicon atoms linked directly to each other, each silicon atom containing two methyl groups attached thereto, said process comprising effecting reaction between a dimethyldichlorosilane and sodium, the amount of sodium employed being present in a molar amount equal to at least two mols of sodium per mol of dimethyldichlorosilane, decomposing the unused sodium in the reaction product, and washing the soluble materials from the reaction product with water.

8. A polymeric composition of matter having the formula [(CH₃)₂Si]₂₈[(CH₃)₂SiO]₁₁Cl₂.

CHARLES A. BURKHARD.

REFERENCES CITED

The following references are of record in the file of this patent:

UNITED STATES PATENTS

| Number | Name | Date |
|---|---|---|
| 2,380,996 | Rochow et al. | Aug. 7, 1945 |

OTHER REFERENCES

Martin: Berichte, Deut. Chem. Gesel., vol. 46, pp. 3289 to 3295 (1913).

Steele et al.: Journ. Chem. Soc. (London), vol. 132 (1929), pp. 2545–50.

Rochow: An Introduction to the Chemistry of the Silicones, Wiley, 1946, pp. 45 and 46.